UNITED STATES PATENT OFFICE.

EDWARD M. LAWRENCE, OF LUBEC, MAINE.

PROCESS OF CANNING SARDINES.

1,037,156.  Specification of Letters Patent.  Patented Aug. 27, 1912.

No Drawing.  Application filed March 16, 1912.  Serial No. 684,332.

*To all whom it may concern:*

Be it known that I, EDWARD M. LAWRENCE, a citizen of the United States, residing at Lubec, in the county of Washington and State of Maine, have invented certain new and useful Improvements in Processes of Canning Sardines, of which the following is a specification.

The process of canning sardines, as practised at the present time, consists first in drying the fish, second, in frying them, which is done by placing them in a perforated receptacle and dipping them in a vat of hot oil, third, packing them, thus cooked, in permanent containers, and fourth, subjecting them to a sterilizing process. Under this process, the oil in which the fish are fried is used over and over again until it becomes too discolored and dirty for further use, after which it is thrown away. The tendency is to continue the use until the fish become more or less discolored and dirty. Moreover, this process necessitates a continual renewal of the oil and loss of large quantities. After the fish are thus fried in mass, they become tender and a large portion are broken and destroyed in handling.

My process may be described as follows: The fish direct from the drier, uncooked, are packed in the permanent containers and are then conveyed uncovered to a machine that supplies them with a measured quantity of oil. The cans, still uncovered, are conveyed over artificial heat at a comparatively slow rate for a time long enough to thoroughly fry the fish. After which they are transferred to the covering and sealing machine.

My present invention obviates all the objections to the old process. Here, there is no loss by breakage in handling, there is no loss of oil, no discoloration or fouling of the fish in frying, no personal contact with the fish after they are cooked, and there is greater uniformity in the fish, due to the fact that each can contains a uniform quantity of oil.

Having thus described my invention and its use, I claim:

The herein described process of canning sardines, which consists in drying them, packing them uncooked in permanent containers, supplying said containers with oil, frying them in said containers, sealing the containers and sterilizing them.

EDWARD M. LAWRENCE.

Witnesses:
 J. H. GRAY,
 G. A. LAWRENCE.